United States Patent
Rohden et al.

(10) Patent No.: US 9,297,358 B2
(45) Date of Patent: Mar. 29, 2016

(54) MAGNUS ROTOR WITH BALANCING WEIGHTS AND METHOD FOR BALANCING A BODY OF REVOLUTION

(75) Inventors: Rolf Rohden, Aurich (DE); Thomas Bohlen, Südbrookmerland (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 554 days.

(21) Appl. No.: 13/821,513

(22) PCT Filed: Sep. 14, 2011

(86) PCT No.: PCT/EP2011/065957
§ 371 (c)(1),
(2), (4) Date: May 24, 2013

(87) PCT Pub. No.: WO2012/035073
PCT Pub. Date: Mar. 22, 2012

(65) Prior Publication Data
US 2013/0302164 A1    Nov. 14, 2013

(30) Foreign Application Priority Data

Sep. 16, 2010   (DE) .......................... 10 2010 040 915

(51) Int. Cl.
*B63H 9/02* (2006.01)
*F03D 7/02* (2006.01)
*F03D 3/00* (2006.01)
*F03D 1/00* (2006.01)
*F03D 3/06* (2006.01)

(52) U.S. Cl.
CPC  *F03D 3/005* (2013.01); *B63H 9/02* (2013.01); *F03D 1/008* (2013.01); *F03D 3/067* (2013.01); *F03D 7/0296* (2013.01); *Y02T 70/58* (2013.01); *Y10T 29/49316* (2015.01)

(58) Field of Classification Search
CPC ......... F03D 1/008; F03D 3/067; F03D 3/005; F03D 7/0296; B63H 9/02; Y02T 29/49316; Y02T 70/58
See application file for complete search history.

(56) References Cited

U.S. PATENT DOCUMENTS

| 2,713,392 A | 7/1955 | Von Karman et al. |
| 4,048,947 A * | 9/1977 | Sicard ................... F03B 17/065 180/2.2 |
| 4,582,013 A | 4/1986 | Holland, Jr. |

(Continued)

FOREIGN PATENT DOCUMENTS

CN   101198516 A   6/2008

(Continued)

*Primary Examiner* — Igor Kershteyn
(74) *Attorney, Agent, or Firm* — Seed Intellectual Property Law Group PLLC

(57) ABSTRACT

The invention relates to a Magnus rotor having a cylindrical body of revolution for converting wind power into a feed force using the Magnus effect. The Magnus rotor having: a rotational shaft about which the body of revolution rotates; a support member on which the body of revolution is mounted; and a body of revolution which has stiffening ribs for the reinforcement thereof. The body of revolution is primed in at least two planes arranged at a mutual spacing in the axial direction perpendicular to the rotational shaft of the body of revolution in order to accommodate balancing weights. The invention further relates to a method for balancing a body of revolution according to the invention.

18 Claims, 5 Drawing Sheets

(56) References Cited

U.S. PATENT DOCUMENTS

Figure 1:
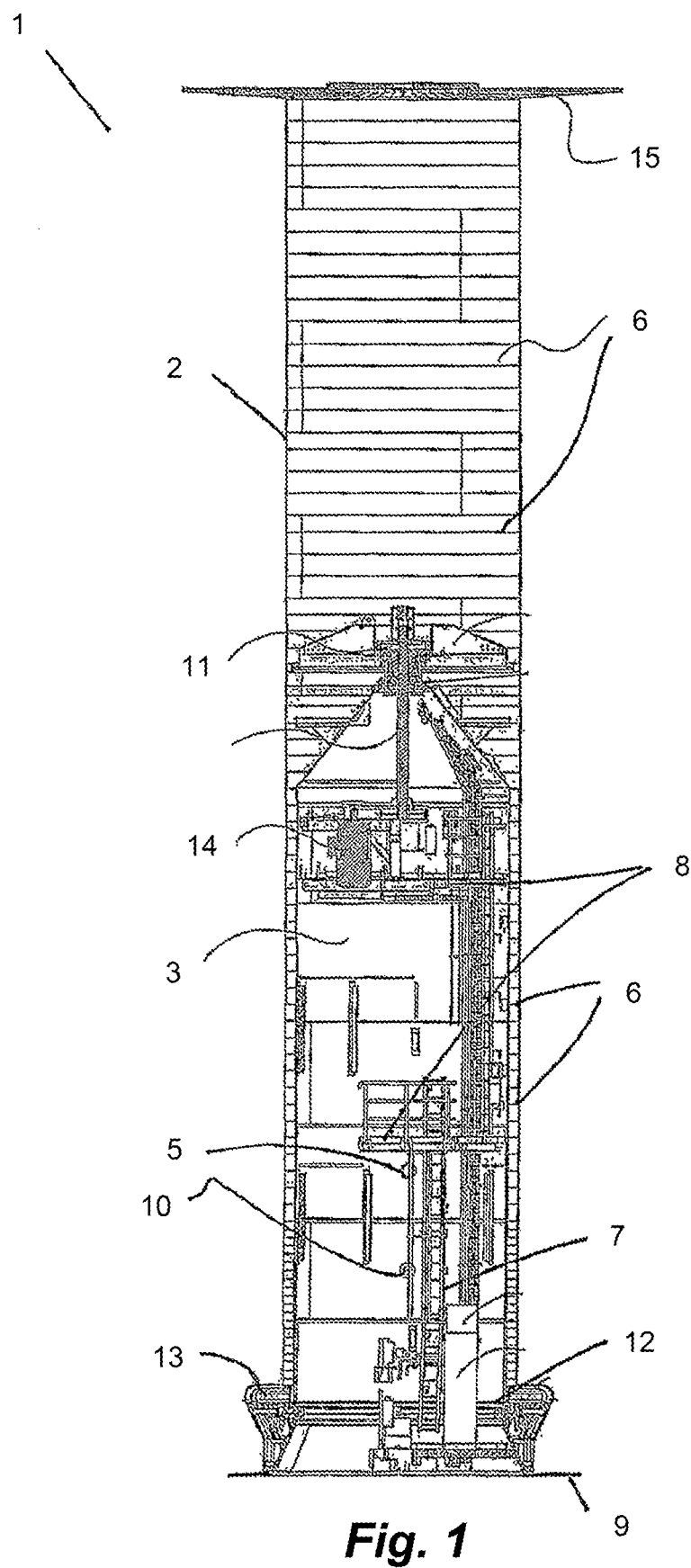

| | | |
|---|---|---|
| 4,602,584 A | 7/1986 | North et al. |
| 8,261,681 B2 | 9/2012 | Wobben |
| 2008/0148723 A1* | 6/2008 | Birkestrand .............. E02B 9/00 60/327 |
| 2009/0241820 A1 | 10/2009 | Rohden |
| 2009/0311924 A1 | 12/2009 | Wobben |
| 2012/0142235 A1 | 6/2012 | Wobben |

FOREIGN PATENT DOCUMENTS

| | | |
|---|---|---|
| DE | 24 30 630 A1 | 4/1976 |
| DE | 27 47 914 A1 | 5/1979 |
| DE | 298 18 774 U1 | 3/1999 |
| DE | 10 2006 025 732 B4 | 5/2010 |
| GB | 2 332 891 A | 7/1999 |
| KR | 10-2008-0017449 A | 12/2014 |

\* cited by examiner

MAGNUS ROTOR WITH BALANCING WEIGHTS AND METHOD FOR BALANCING A BODY OF REVOLUTION

BACKGROUND

1. Technical Field

The present invention concerns a Magnus rotor having a rotary body for converting the wind power into a propulsion power utilizing the Magnus effect and a method of balancing such a rotary body.

2. Description of the Related Art

A Magnus rotor, also referred to as a Flettner or sailing rotor or a similar rotationally symmetrical rotary body rotates about an axis of rotation and thereby, utilizing the Magnus effect, converts an air flow, in particular wind, into a force approximately transverse relative to the air flow, which can be used as a propulsion force.

Upon a rotary movement of the Magnus rotor, particularly in the case of large Magnus rotors, imbalances can occur due to asymmetrical distribution of mass. By virtue of the imbalances, oscillations occur which disturb smooth running of the Magnus rotor and can lead to increased wear of the bearings or even destruction thereof.

In the case of a rigid rotary body, in particular with a rigid axis of rotation, that is to say in the case of a rotary body in which only negligibly small deformation phenomena occur in the region of the operating rotary speed so that the rotary body behaves approximately like an ideal rigid body, balancing in two planes or even only in one plane—simple balancing—is sufficient. In that case a plane is perpendicular to the axis of rotation of the rotary body at a predetermined position in the axial direction of the axis of rotation and is limited by the periphery of the rotary body.

If however a sailing rotor is so long in the axial direction that no longer behaves a rigid body, simple balancing is no longer sufficient to achieve stable rotary movement without imbalance.

As general state of the art attention is directed to DE 10 2006 025 732 A1 and DE 29 818 774 U1.

BRIEF SUMMARY

The Magnus rotor according to one embodiment of the invention serves to convert wind power into a propulsion force utilizing the Magnus effect. It has a rotary body which is prepared for rotation and which is rotationally symmetrical with respect to an axis of rotation, and a carrier on which the rotary body is mounted, and is in the form of a cylinder. Such a shape achieves a uniform afflux flow of wind and is advantageous in terms of production engineering. In addition the rotary body has means which stiffen it—referred to hereinafter as stiffening means.

The rotary body is adapted to receive balancing weights at a predetermined location in at least two planes spaced from each other in the axial direction, perpendicularly to the axis of rotation. The predetermined locations in that case are disposed in such a plane at different positions in the peripheral direction of the rotary body. In other words, with a circular periphery of 360°, for example each location can be adapted to receive balancing weights in 10° steps from 0° to 360° in a plane. That is to say balancing is effected in three dimensions.

Mounting the weights at such a predetermined location serves to balance the rotary body. In that respect, in the case of a rotary body in which it is no longer possible to assume that it behaves like a rigid body, such as for example a Magnus rotor, at least two planes are necessary in the axial direction of the axis of rotation to counteract deformation caused by imbalance.

Alternatively the rotary body has weight bodies, from which for example mass can be removed by way of borings.

Preferably there is also an end disc which is disposed at the upper end of a perpendicularly disposed Magnus rotor, adapted for balancing. By virtue of a large lever arm—with for example a height of over 25 meters of the Magnus rotor—high bending moments occur at the end disc, and they disturb smooth running of the Magnus rotor.

A preferred embodiment of the Magnus rotor provides that balancing weights are mounted at at least two stiffening means. To provide for precise balancing at the locations of the eigenmode forms which occur, it is proposed that the stiffening means are provided for example at a uniform spacing of a meter relative to each other in the axial direction of the axis of rotation. Preferred spacings are 0.5 to 2 meters, in particular 0.8 to 1.5 meters. Alternatively the spacings of the stiffening means can also extend irregularly in the axial direction of the axis of rotation. Preferred spacings are 0.8 meter at one end of the rotary body increasing in the axial direction to spacings of 1.5 meters at the other end of the rotary body.

In a further preferred embodiment the rotary body and/or the carrier of the Magnus rotor are accessible from the interior. The internal space of the Magnus rotor is thus easily accessible for example for ascertaining the imbalances and/or for the subsequent balancing operation. The accesses to the respective positions at which balancing weights are to be mounted or removed can be reached for example by way of ladders and platforms.

Preferably there is provided a carrier which is disposed at least partially in the interior of the rotary body and has openings through which service personnel gain access from the carrier on to at least one of the stiffening means. The openings could for example also be disposed at regular spacings in the axial direction of the axis of rotation, in which case the number of openings can be adapted as required.

In a preferred embodiment the openings are closed by cover members. The cover members can be fitted for example by way of a screw connection and can thus also be removed when required. That has the advantage that, in operation of the Magnus rotor, there is no safety risk for example for service personnel through the openings, but nonetheless access from the carrier is possible to the stiffening means if required for fitting balancing weights.

Preferably the stiffening means are disposed on the inside of the rotary body and respectively extend in the peripheral direction. They are in particular in the form of ribs and/or peripherally extending webs.

It is advantageous inter alia if the stiffening means have recesses, holes and/or projections at regular spacings over the entire periphery. In that way for example the balancing weights can be fitted at various predetermined positions in a plane of the rotary body on the stiffening means in each case in the region of such a recess or such a projection. Preferably the recesses, holes and/or projections are at a spacing of 10 cm.

In a further preferred embodiment a drive engine or motor is arranged in the interior of the carrier. It is advantageous in that respect if the drive engine or motor is protected from weather influences such as for example wind and rain and thus not only is the equipment protected but maintenance operations are also independent of the weather.

In accordance with the invention, based on such a Magnus rotor, there is proposed a method of balancing same. In that respect the rotary body is firstly driven by way of the drive engine or motor for detecting the imbalances. It is advantageous in that respect that the drive engine or motor which rotates the rotary body is a fixed component part of the Magnus rotor and can thus also be used for example in the operating condition for detecting imbalances. In addition there is no need for an additional separate device for rotating the rotor. Alternatively rotation of the rotary body and detection of the imbalances can also be carried out on land on a sailing rotor stand.

In that case the imbalances of the rotary body of the Magnus rotor are detected in at least two axially displaced planes perpendicularly to the axis of rotation of the rotary body—referred to hereinafter as the balancing planes. Preferably the imbalances are detected by way of strain gauge strips which are mounted for example in each plane. It is advantageous in that respect if strain gauge strips which are already present and which are permanently fitted to the rotary body in order to measure for example the propulsion force can be used.

After evaluation of the measurement results balancing weights are fitted to and/or removed from the stiffening means or elsewhere, at the predetermined locations in the respective planes for suppressing the imbalance. That permits highly precise balancing. In accordance with an ascertained number of the required balancing planes and the position in that plane on the periphery of the rotary body, fitment and/or removal of the balancing weights can be effected at the respective required positions.

Preferably the balancing weights are fitted on the opposite side to the imbalance, that is to say at an angle of 180° from the detected imbalance.

Preferably, in the rotary movement, the imbalances of the end disc are also detected and then balanced by fitting and/or removing balancing weights.

Preferably the balancing weights can be mounted to the stiffening means through openings in the carrier or can be removed from the stiffening means through the openings. Preferably the carrier is accessible and supports the rotary body. Preferably the openings are disposed on such a carrier. That guarantees easy accessibility to the locations at which the balancing weights have to be fitted and/or removed. In addition fitment or removal is possible at any location at which there is an opening. For removal purposes the weight bodies can be reduced by drilling, grinding or milling. Alternatively, in the case of a releasable connection such as for example a connection involving a threaded pin, the weight bodies can be dismantled.

Preferably the balancing weights are each fixed by means of a threaded pin or other connection device. Another procedure when mounting the balancing weights is for example clamping them fast and/or fixing them by means of magnetic force or by means of adhesive.

Preferably the number of planes which are spaced from each other in the axial direction and which are arranged perpendicularly to the axis of rotation of the rotary body and in which the balancing weights are fitted or removed is established by way of the individual flexural eigenmode forms which occur at predetermined rotary speeds below the operating rotary speed. If a plurality of flexural eigenmode forms occur, then the degree of flexural eigenmode form of the highest rotary speed occurring, below the operating rotary speed, is to be taken into account in respect of the number of planes in which balancing weights are fitted and/or removed. If therefore the tenth flexural eigenmode form occurs at the highest rotary speed below the operating rotary speed, that is to be taken into account in relation to the number of planes, namely at least ten balancing planes are to be provided. If in contrast for example only three flexural eigenmode forms occur, then also only those are to be taken into account.

The highest occurring rotary speed for determining the number of flexural eigenmode forms is for example in a range of 60%-100% of the operating rotary speed. Preferably a range of 80%-95% of the operating rotary speed is to be used. The range is for example in the case of an operating rotary speed of 300 rpm, at 240 rpm to 285 rpm.

In a further preferred embodiment, for n flexural eigenmode forms, m balancing weights are fitted in o axially mutually spaced planes arranged perpendicularly to the axis of rotation of the rotary body. In that case n, m and o are whole numbers of greater than 1. Additional balancing of the rigid rotary body can be advantageous. In that case balancing is effected in two further such planes. Thus, for n flexural eigenmode forms, m+2 balancing weights are fitted in o+2 planes. It is advantageous in that respect if, with additional balancing of the rigid rotary body, smooth running of the drive device is also achieved even at low rotary speeds. Thus for example when ten flexural eigenmode forms occur it would be possible to use ten or twelve balancing weights, while when for example three flexural eigenmode forms occur, it would be possible to use three or five balancing weights.

Preferably a Magnus rotor has one or more of the features which was or were described hereinbefore in connection with the description of the method. Such balancing on a Magnus rotor results in very precise balancing—fine balancing—in spite of the size and weight of the Magnus rotor, as for example the theoretically ascertained number of balancing planes is available and fitment and/or removal of the balancing weights at the required positions is easy to perform.

It is desirable for the Magnus rotor according to the invention to be used for a ship. In particular a ship is suitable for that purpose, in which at least one Magnus rotor with a perpendicularly disposed rotary body is used, and can serve as a main or auxiliary drive.

BRIEF DESCRIPTION OF THE SEVERAL
VIEWS OF THE DRAWINGS

The invention is described by way of example hereinafter with reference to the accompanying Figures.

Figure 2:
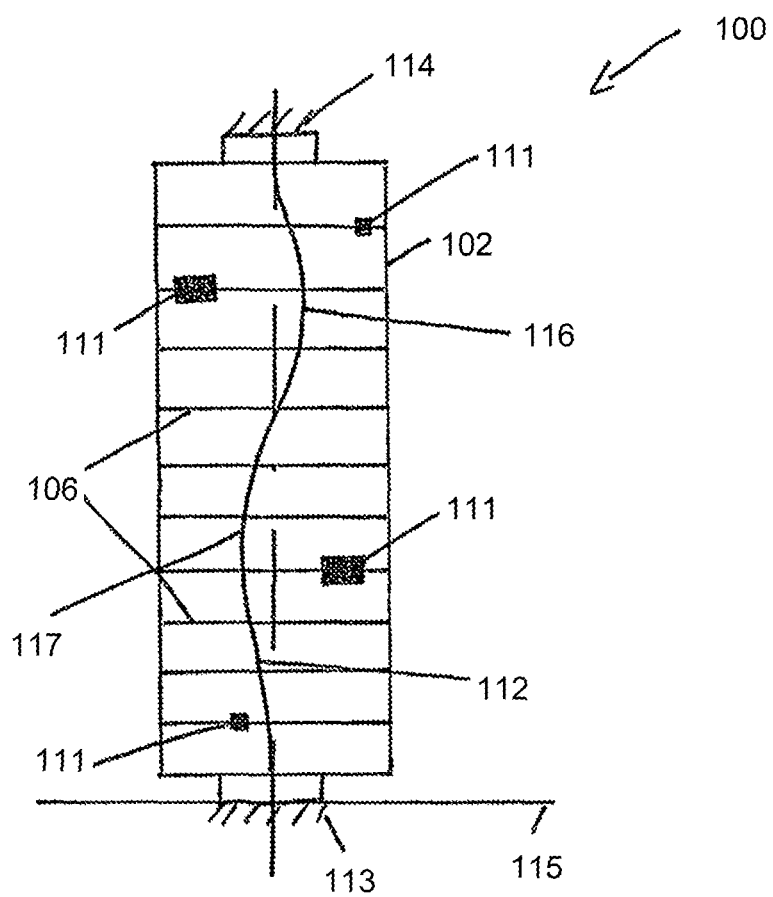
Figure 3:
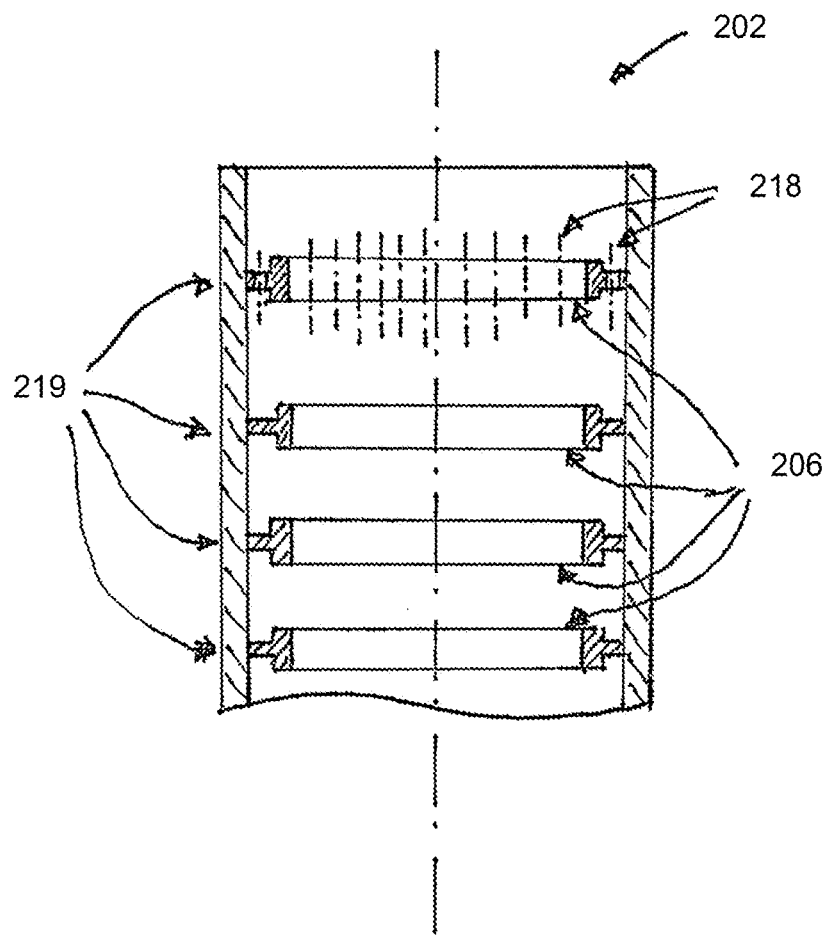
Figure 4:
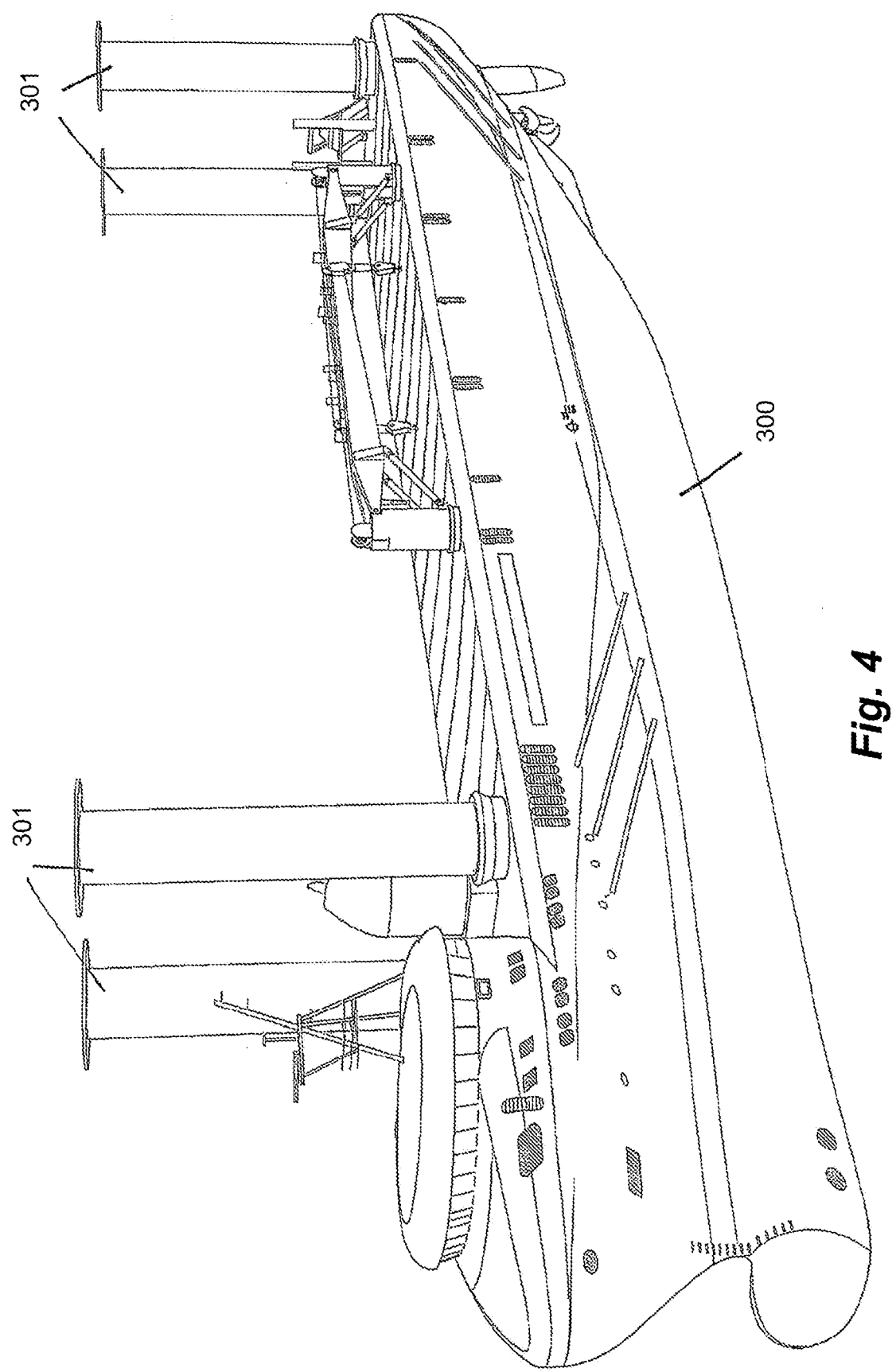
Figure 5:
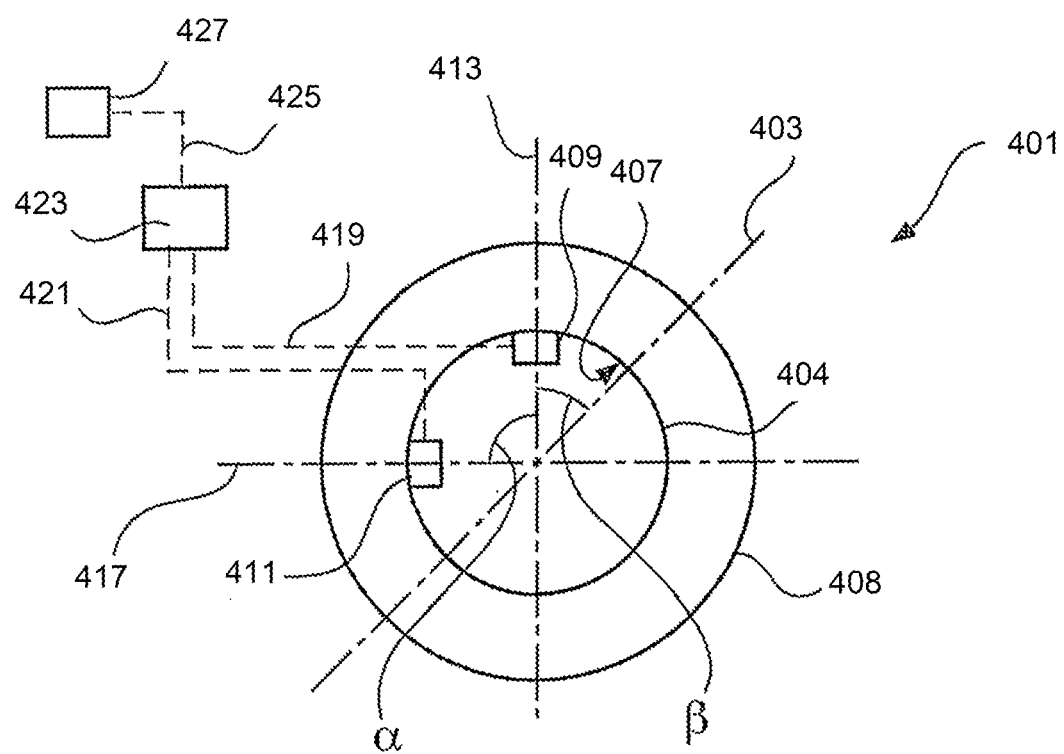

FIG. 1 diagrammatically shows a front view in section of a Magnus rotor according to the invention, FIG. 2 diagrammatically shows a sectional view of a Magnus rotor with balancing weights, FIG. 3 shows a rotary body viewed from the inside, FIG. 4 diagrammatically shows a ship with four Magnus rotors, and FIG. 5 diagrammatically shows the arrangement of strain gauge strips in a Magnus rotor.

FIG. 1 shows a preferred Magnus rotor 1 having a rotary body 2 of a cylindrical shape.

DETAILED DESCRIPTION

Referring to FIG. 1 the Magnus rotor 1 includes a rotary body 2 which is adapted to rotate and which is rotationally symmetrical relative to an axis of rotation and which is supported by way of a carrier 3. The rotary body 2 is a cylindrical hollow body which stands perpendicularly on a plane 9 which is part of a ship—hereinafter referred to as the ship's plane. Shown on the inside of the rotary body 2 are ribs 6 serving as stiffening means for stiffening the rotary body 2. They extend in the peripheral direction of the rotary body 2. In addition the ribs 6 are used for receiving balancing weights. For that purpose the ribs are provided with recesses, holes and/or projections at regular spacings in the peripheral direction. It is possible to use screwthreaded pins for connecting the balancing weights to the ribs 6. The ribs 6 extend over the entire periphery in the axial direction with respect to the axis of rotation at a predetermined spacing relative to each other. In that case the spacing of the ribs 6 is smaller in a portion adjacent to the plane 9 and larger in a distal portion. Thus the stiffness of the rotary body 2 in the portion adjacent to the plane 9 is higher than in the distal portion.

The carrier 3 in the interior of the rotary body 2 has a bearing 11 supporting the Magnus rotor 2 on the carrier 3. In that case the bearing 11 can be in the form of a roller, ball or rolling bearing. As shown in FIG. 1 disposed in a plane 12 which is at a predetermined spacing in the axial direction of the axis of rotation of the rotary body 2 above the ship's plane 9 are guide rollers 13 disposed at the outer periphery. The guide rollers 13 bear against the rotary body 2 and guide it in its rotary movement.

The negotiable internal space in the carrier 3 is shown in FIG. 1. It is possible here to see openings 5 for passing through from the carrier 3 to the rotary body 2. They can be closed by way of cover means 10 so that the openings 5 do not represent a danger to service personnel in the operating condition. Also shown here are ladders 7 and platforms 8, by way of which for example the service personnel can reach different planes of the rotary body 2. The openings 5 can also be used as ventilation openings. For that purpose the cover means 10 is advantageously in the form of a grill or the like.

In addition FIG. 1 shows an end plate 15 disposed at the upper end of the rotary body 2. In that respect the end plate can be disposed for example at a height of over 25 meters.

FIG. 2 diagrammatically shows a Magnus rotor 100 including a cylindrical rotary body 102, stiffening means 106, upper and lower bearings 113, 114 and an axis of rotation 110. The stiffening means 106 may be of the same structure as ribs 6 of FIG. 1. The rotary body 102 stands perpendicularly on a plane 115 which is preferably part of a ship and is supported at the upper and lower ends at respective bearings 113, 114. The rotary body 102 can perform a rotary movement about the axis of rotation 110 and has stiffening means 106 which serve to stiffen the rotary body 102 and which can be adapted to receive balancing weights 111. As can be seen in FIG. 2 a total of four balancing weights 111 are fitted to the stiffening means 106. The balancing weights 111 are fitted in different planes in different peripheral positions of the rotary body 102 on the stiffening means 106. They are of differing size and for example could additionally differ in respect of weight in order to be used according to the respective magnitude and position of the imbalances which have been ascertained. Such imbalances can occur by virtue of asymmetrical distribution of mass on the rotary body 102. In the case of elastic rotary bodies the imbalances cause flexural oscillations with corresponding flexural eigenmode forms which are dependent on the speed of rotation of the Magnus rotor 100.

By way of example FIG. 2 shows a flexural line 112 with two flexural eigenmode forms 116 and 117 which are intended to show the effects of imbalance-induced oscillations at the rotary body 102. The extents of the oscillations are shown on an enlarged scale to better illustrate them. The flexural line 112 no longer coincides with the axis of rotation 110. To avoid that unbalance-induced flexing balancing weights 111 are fitted at the stiffening means 106 of the rotary body 102, alternatively or additionally weight bodies can be removed.

In total four balancing weights 111 are shown in four planes perpendicularly to the axis of rotation 110 of the rotary body 102. Thus in the illustrated example balancing of the rigid body is taken into consideration in two further planes perpendicularly to the axis of rotation 110 of the drive device 100. The rigid body balancing affords smooth running of the drive device 100 even at low rotary speeds.

Without the rigid body balancing, the rotary body 102 would only require two balancing weights 111 for two flexural eigenmode forms.

Referring to FIG. 3 a rotary body 202 of a Magnus rotor according to the invention is shown from the inside. The Figure shows the rotary body 202, ribs 206 and holes 218 in the ribs 206. The rotary body 202 is shown in the part of the Magnus rotor, which is above a carrier on which the rotary body 202 is supported.

The ribs 206 are provided with holes 218 at different peripheral positions in axially spaced planes 219 perpendicularly to the axis of rotation of the rotary body 2 in order to fit balancing weights at predetermined locations. The spacings of the holes are arranged regularly in the peripheral direction with respect to each other and could each be for example 10 cm. The planes 219 can be at the same or also different axial spacings relative to each other.

The respective planes 219 of the ribs 206 can be reached for example by way of ladders for fitting and/or removing balancing weights.

Referring to FIG. 4 shown therein is a ship 300 having four Magnus rotors 301. In this case the Magnus rotors 301 stand perpendicularly on the deck 309 of the ship 300 and are used as a main or auxiliary drive.

Referring to FIG. 5, the Magnus rotor 401 has the carrier 404 within the rotary body 408. Arranged at the inside surface 407 of the carrier 404 as part of a measuring device are a first strain gauge sensor 409 and a second strain gauge sensor 411. The measuring device is adapted to determine a flexural loading of the rotor mounting means as a result of a substantially radial force loading due to the effect of force on the rotary body 408. The measuring device has the two strain gauge sensors 409, 411 which in the present embodiment are arranged at an angle α of 90° relative to each other. The first strain gauge sensor 409 is disposed on a first axis 413, viewed from the center point of the carrier 404. The first axis 413 extends at an angle β relative to the longitudinal axis of the ship. In a particularly preferred embodiment the angle β=0°. The second strain gauge sensor 411 is arranged at the inside surface 407 of the carrier 404 along a second axis 417, viewed from the center point of the carrier 404. In a particularly preferred embodiment the angle between the first axis 413 and the second axis 417 α=90°.

The first strain gauge sensor 409 is connected by means of a signal line 419 to a data processing installation 423. The second strain gauge sensor 411 is connected by means of a second signal line 421 to the data processing installation 423. The data processing installation 423 is connected by means of a third signal line 425 to a display device 427. The display device 427 is adapted to display the direction and magnitude of the force acting on the carrier 404, because of the unbalance.

The strain gauge sensors 409, 411 of the measuring device and the device itself, in addition to or alternatively to the described function of determining the unbalances acting on the carrier 404, can also be used for detecting a propulsion force at the rotary body 408 and/or for determining adhering ice by means of meteorological data to establish same, to adjust operation of the Magnus rotor 404 in question and to thaw it out.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Magnus rotor for converting wind power into a propulsion force utilizing the Magnus effect, the Magnus rotor comprising:
    a carrier;
    a cylindrical rotary body mounted on the carrier, the cylindrical rotary body having an axis of rotation around which the rotary body rotates, the rotary body having means for stiffening the rotary body; and
    balancing weights secured to the rotary body in at least two planes spaced from each other in the axial direction perpendicularly to the axis of rotation of the rotary body.

2. The Magnus rotor according to claim 1 wherein the balancing weights are secured to the stiffening means.

3. The Magnus rotor according to claim 1 wherein at least one of the rotary body and the mounting device is accessible from an interior of the rotary body.

4. The Magnus rotor according to claim 1 wherein the carrier is arranged at least partially in the interior of the rotary body and has openings to permit service personnel access from the carrier to at least one of the stiffening means.

5. The Magnus rotor according to claim 1 further comprising a cover to close the openings.

6. The Magnus rotor according to claim 1 wherein the stiffening means are disposed on the inside of the rotary body and extend in the peripheral direction of the rotary body.

7. The Magnus rotor according to claim 1 wherein the stiffening means have at least one of recesses, holes and projections at a regular spacing around the entire periphery.

8. The Magnus rotor according to claim 1 further comprising a drive motor arranged in an interior of the carrier, the drive motor being configured to drive the rotary body.

9. The Magnus rotor according to claim 1 wherein the number of planes spaced from each other in the axial direction perpendicularly to the axis of rotation of the rotary body in which balancing weights are secured, depends on the individual flexural eigenmode forms that occur at a predetermined rotary speed below an operating rotary speed.

10. The Magnus rotor according to claim 1 wherein for n flexural eigenmode forms m balancing weights are fitted in o axially mutually spaced planes perpendicularly to the axis of rotation of the rotary body or m+2 balancing weights are fitted in o+2 planes perpendicularly to the axis of rotation of the rotary body.

11. The Magnus rotor according to claim 1 wherein the stiffening means is a plurality of ribs.

12. A method of balancing a Magnus rotor having a rotary body, the method comprising:
    rotating the rotary body about an axis of rotation;
    detecting imbalances of the rotary body in at least two planes that are axially displaced and arranged perpendicularly to the axis of rotation of the rotary body; and
    securing corresponding balancing weights to ribs on the rotary body in the respective planes to minimize the imbalance.

13. The method according to claim 12 wherein securing the corresponding balancing weights to ribs on the rotary body further comprises accessing the ribs by way of openings in a carrier.

14. The method according to claim 12 wherein securing the corresponding balancing weights to ribs comprises securing the corresponding balancing weights with at least one threaded pin.

15. A ship comprising:
    a Magnus rotor including:
        a carrier;
        a cylindrical rotary body mounted on the carrier; the cylindrical rotary body having an axis of rotation around which the rotary body rotates, the rotary body including ribs for stiffening the rotary body; and
        first and second balancing weights secured to the rotary body, wherein the first balancing weight is in a first plane and the second balancing weight is in a second plane, the first and second planes being spaced from each other in the axial direction perpendicularly to the axis of rotation of the rotary body.

16. The ship according to claim 15 wherein the first and second balancing weights are secured to the ribs.

17. The ship according to claim 15 wherein the ribs are located on an interior portion of the cylindrical rotary body.

18. The ship according to claim 15 wherein the ribs extend around the entire perimeter of the rotary body.

* * * * *